(No Model.)
F. LAQUA.
HARVESTER REEL.
No. 317,150. Patented May 5, 1885.
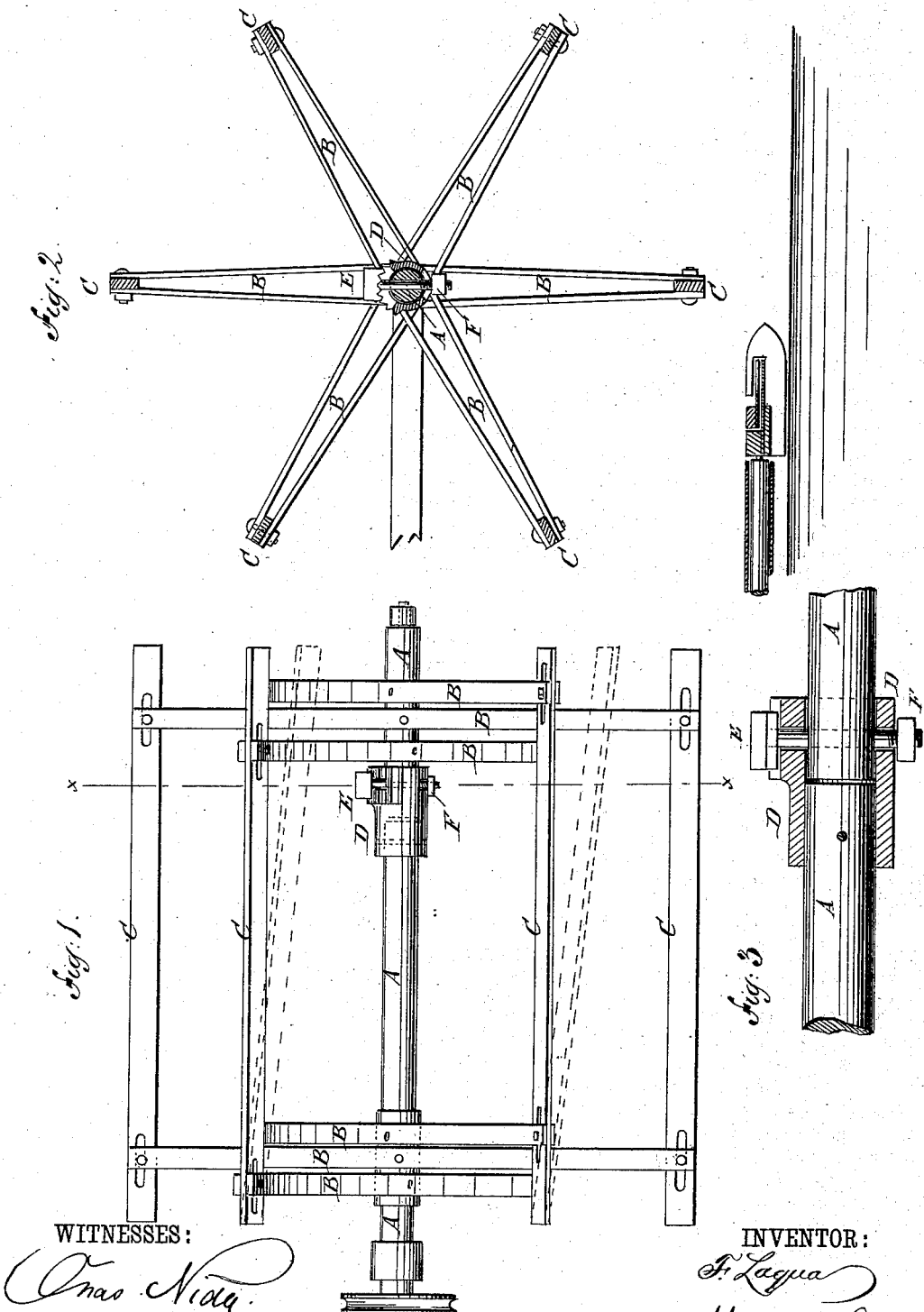
WITNESSES:
INVENTOR:
F. Laqua
BY Munn & Co
ATTORNEYS.

UNITED STATES PATENT OFFICE.

FREDERICK LAQUA, OF THIELMANTON, MINNESOTA.

HARVESTER-REEL.

SPECIFICATION forming part of Letters Patent No. 317,150, dated May 5, 1885.

Application filed July 11, 1884. (No model.)

*To all whom it may concern:*

Be it known that I, FREDERICK LAQUA, of Thielmanton, in the county of Wabasha and State of Minnesota, have invented a new and useful Improvement in Harvester-Reels, of which the following is a full, clear, and exact description.

Reference is to be had to the accompanying drawings, forming a part of this specification, in which similar letters of reference indicate corresponding parts in all the figures.

Figure 1 is a side elevation of a harvester-reel to which my improvement has been applied. Fig. 2 is a sectional end elevation of the same, taken through the line $x\,x$, Fig. 1. Fig. 3 is a side elevation of a part of the reel-shaft enlarged, the sleeve being shown in section.

The object of this invention is to secure the delivery of the cut grain upon the apron of the harvester in proper direction to be taken to the binder, and thus prevent the cut grain from being scattered upon the apron and wasted.

The invention consists in a harvester-reel constructed with the reel-shaft in two parts, connected by a corrugated and slotted sleeve permanently attached to one part, and connected with the other part by a bolt having the inner side of its head corrugated, as will be hereinafter fully described.

A represents the reel-shaft, which is supported and driven from the harvester in the ordinary manner. B are the reel-arms, and C are the reel-bars. The reel-shaft A is made in two parts, the adjacent ends of which meet at a little distance from the outer reel-arms, B. Upon the adjacent ends of the parts of the shaft A is placed a sleeve, D, which is permanently secured to the end of the inner part of the said shaft by a bolt or rivet.

In the outer part of the sleeve D is formed a short transverse slot to receive the bolt E, which also passes through a bolt-hole in the outer part of the shaft. The slotted part of the sleeve D is toothed or corrugated to fit into corresponding teeth or corrugations on the under side of the head of the bolt E to prevent the said bolt from slipping when drawn into place by the nut F. With this construction, by loosening the nut F and bolt E the outer part of the reel-shaft A can be slightly turned forward or backward to give a slightly forward or backward inclination or gather to the reel-bars C, as the condition of the grain may require, to cause the grain to be laid squarely and evenly upon the apron and in proper position to be carried to the binder without being scattered and wasted.

Having thus described my invention, I claim as new and desire to secure by Letters Patent—

1. A harvester-reel made substantially as herein shown and described, with its shaft in two parts connected by a slotted and corrugated sleeve, and a bolt having the under side of its head corrugated, as set forth.

2. In a harvester-reel, the combination, with the reel-shaft A, made in two parts, of the slotted and corrugated sleeve D, and the bolt E, having the under side of its head corrugated, substantially as herein shown and described, whereby the reel-shaft can be readily adjusted to give a forward or backward gather to the reel-bars, as set forth.

FREDERICK LAQUA.

Witnesses:
 ROBERT HALPAUS,
 JOSEPH LAQUA, Jr.